March 29, 1932.   P. VANDER HAEGHEN   1,851,902
SERVO MOTOR
Filed Oct. 23, 1929   3 Sheets-Sheet 3

Inventor:
P. Vander Haeghen
By Emil Bonnelycke
Attorney

Patented Mar. 29, 1932

1,851,902

UNITED STATES PATENT OFFICE

PAUL VANDER HAEGHEN, OF BERCHEM STE. AGATHE, BELGIUM, ASSIGNOR TO SOCIÉTÉ ANONYME COMPAGNIE INTERNATIONALE DES FREINS AUTOMATIQUES, OF LIEGE, BELGIUM

SERVO-MOTOR

Application filed October 23, 1929, Serial No. 401,802, and in Belgium October 27, 1928.

The present invention relates to a hydraulic servo motor operating upon a device which can be held in any one of several positions determined by points indicated along the path of movement. This type of servo motor is particularly suitable for governing controllers on electrically driven locomotives in multi unit trains and also for operating vehicle doors.

The driven member is actuated by means of one or several pistons which move in suitable cylinders, arranged for connection either with the charging reservoir containing the liquid under pressure, or with a discharge reservoir to receive the exhaust liquid from the receiver.

The immobilization of the driving pistons in the various positions corresponding to those assumed by the control lever of the servo-motor, is practically obtained by closing the feed or exhaust ducts for the liquid which comes from the receiver.

The closing members being usually actuated electromagnetically by means of solenoids, as a result the control-circuits have a certain amount of self-induction, which causes delay in the working of the closing members. These delays are also caused by the sparks when cutting off the current at the different contacts of the current switch.

These delays make an exact regulation of the stopping positions of the power pistons difficult.

The present invention avoids these disadvantages, by providing a control for the discharge of the liquid, which takes place when the driven member is in motion, by means of a closing member, which, when the driven member is in motion, is arranged to stop the flow of the liquid and consequently the movement of the receiving member, this closing member or valve being also controlled by a mechanical device, which only allows this valve to operate when the driven member is in the position corresponding to that occupied by the hand lever of the servo-motor.

The annexed drawings show as an example only and not in a limiting manner, one embodiment of the invention. The same comprises the various original features of the arrangements shown.

Figure 1:
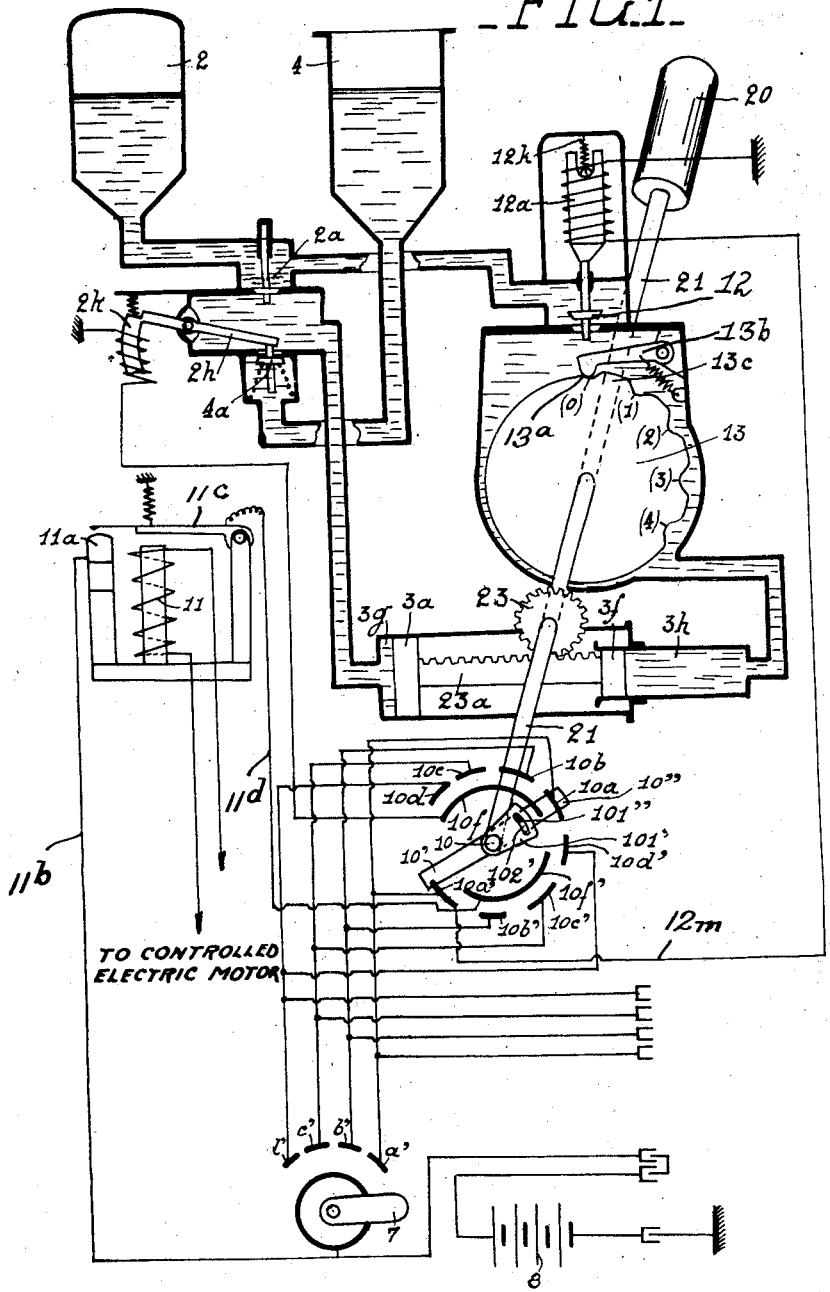
Figure 2:
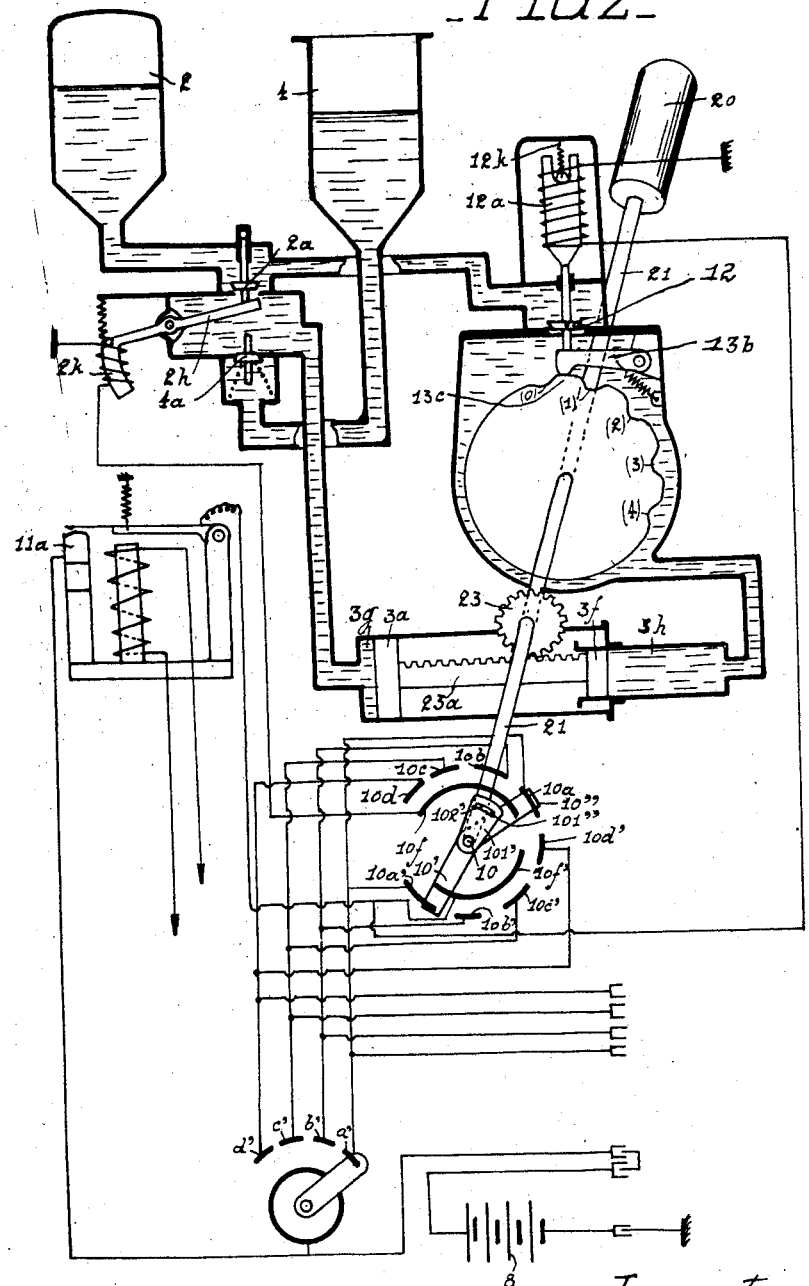
Figure 3:
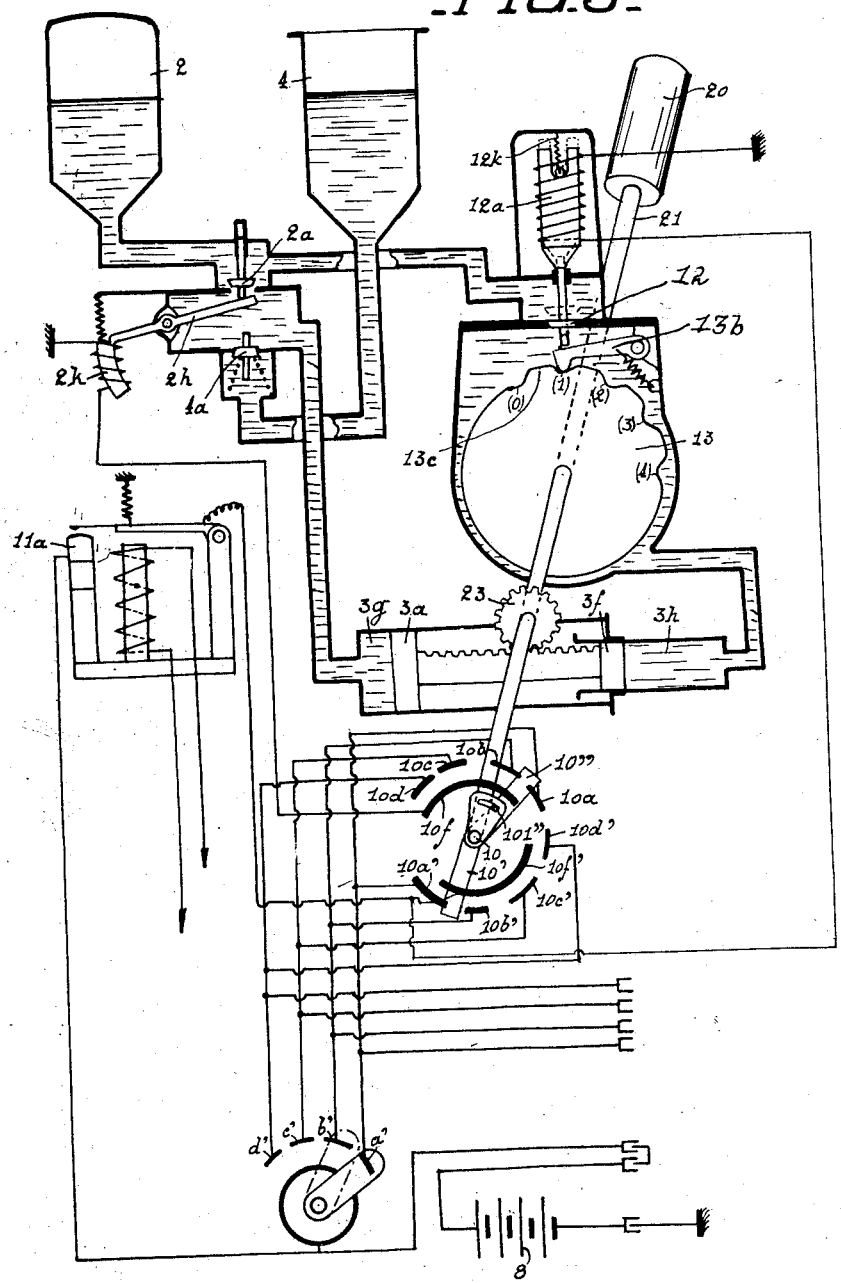

Figure 1 is a diagrammatic view of a servo-motor according to the invention; and Figures 2 and 3 are corresponding views but with some of the parts in different positions.

The controlled member is shown diagrammatically in the form of a drum 20 secured on shaft 21. On this shaft are also mounted a member 13 having a special outline, a tooth wheel 23 and an auxiliary lever 10'. Tooth wheel 23 meshes with a rack 23$^a$ integral with pistons 3$^a$ and 3$^f$ which move within cylinders 3$g$ and 3$h$, which can be connected either with the charging reservoir 2 containing the intermediate liquid and a gas under pressure, or with a discharge reservoir 4.

In the embodiment shown, the pistons 3$a$ and 3$f$ are of different diameters, the cylinder 3$g$ in which the piston 3$a$ moves has the larger diameter and can be put into communication alternately with the charging reservoir 2 or with the discharge reservoir 4, by means of the valves 2$a$ and 4$a$.

The valves are actuated by one arm of a lever 2$h$, of which the other arm carries a core influenced by an electro-magnet 2$k$, whose electric circuit is controlled on the one hand by auxiliary handle 10' actuated by the driven member, and on the other hand by the control lever 7 of the servo-motor.

Auxiliary levers 10' and 10'' are pivoted about a common center 10 coinciding with the axis of shaft 21, and while lever 10' is fast on this shaft, lever 10'' is controlled through a lost motion connection by handle 10'. For this purpose, lever 10' is provided with an extension 101', on which is cut a circular slot 102', in which moves a pin 101'' integral with lever 10''.

When the lever 10' swings, it connects electrically one of the contacts 10$^{a\prime}$, 10$^{b\prime}$, etc., with contact 10'' located in the circuit of an electromagnet 2$^k$.

The piston 3$f$ of smaller diameter moves in a cylinder 3$h$ permanently connected with the charging reservoir 2.

Supposing that in the arrangement shown in Figure 1 the driven member is in the zero position for working, then the liquid under pressure from the reservoir 2 will be admitted into the cylinder 3g. With this object, the control lever 7 of the servo-motor will be placed for instance on the first contact a', which will have the effect of exciting through the intermediary of contacts $10^a$, $10''$, $10^t$ the electro-magnet 2k of the valves 2a and 4a: said electro-magnet is arranged so that when it is excited it will cause the valve 2a to open and the valve 4a to close, under the action of a return spring. This closing takes place owing to the fact that the tension of the return spring is sufficient to keep the valve 4a closed, in spite of the opposite effort to which it is subjected by the liquid under pressure when the valve 2a is open. The control of the valves 2a and 4a by means of one electro-magnet only, has the advantage of never allowing these two valves to be opened simultaneously and therefore of avoiding any direct flow of liquid from the reservoir 2 to the reservoir 4.

To stop the movement of the driven member, it suffices either to stop the entrance of the liquid into the cylinder 3g or to stop the discharge of the liquid from the cylinder 3h.

According to the embodiment shown in Figure 1, this latter arrangement is used.

For this purpose, a magnetically operated valve 12 which constantly tends to open by the action of a spring 12k, is placed in the duct which connects the cylinder 3h with the charging reservoir 2. This valve 12 is caused to close when its electro-magnet is excited, but according to the position of a lever $13^b$ which acts in the cam shaped notches of a member 13, it will be either opened or closed.

Lever $13^b$ is pivoted about a point which is fixed with respect with the whole of the servo motor, and it is subjected to the action of a spring $13^c$ tending to maintain it in notches upon the periphery of member 13. Lever $13^b$ comes to rest between the stem of valve 12 and member 13. The notches cut on this member 13 are of such a depth that when electro-magnet $12^a$ is excited, valve 12 will be closed on its seat when the end of lever $13^b$ is in engagement with one of the notches.

The apparatus works as follows: If the control lever 7 is placed on the contact a', the electro-magnet 2k of the valves 2a and 4a is excited and the valve 2a opens, which allows the liquid contained in the charging reservoir 2 to be discharged and to act on the face of the piston 3g.

The valve 12 being kept open by the action of its spring the liquid can evacuate from the space 3h in which the small piston 3f moves, towards the charging reservoir 2. These pistons move therefore and the whole of the apparatus is put in motion.

The lever 10' keyed on to the common shaft of the servo-motor, after having moved through an angle equal to about half the angle contained between two successive contacts such as $10^a$ and $10^b$, closes the circuit of the electro-magnet of the valve 12 and allows the current to pass through the contact 10a' (Figure 2). As a result, the valve 12 is induced to close but is prevented from doing so by the lever $13^b$ which at this time rests on a raised portion on the periphery of member 13.

At this moment the lever 10'' may be displaced by the lever 10' owing to a pin contacting with the end of a slot made in a part of the hand lever 10'.

The whole of the device continuing to be displaced, a time arrives when the finger 13b falls into the notch 13a (1) the valve 12 closes and the whole of the device is stopped (Figure 3, full line showing).

At this moment, the lever 10' is still in touch with the contact 10a' and the lever 10'' having been displaced through an angle equal to about half the angle contained between two consecutive contacts, is therefore engaged partly with the contact 10a and partly with the contact 10b.

The periphery of the member 13 may preferably be shaped so that its movement causes progressive closing of the valve 12, for this purpose the corners of the notches 13a may for instance be rounded off.

In this way, the kinetic energy of the moving parts would be diminished progressively and practically destroyed when the finger 13b contacts at the bottom of notch 13a. The strength of the electro-magnet 12a prevents the pressure from forcing open valve 12. The result would be very precise stops in the different positions of the receiving member.

To pass to the next position (Figure 3, dotted lines showing), the hand lever 7 is placed on the contact b' and thereby at this moment the circuit of the electro-magnet of the valves 2a and 4a is closed by means of the lever 10'' engaged with the contact 10b. As a result the valve 2a remains open.

The electro-magnet 12a of the valve 12 no longer being excited, because the current no longer passes through the contact 10a', but through the contact 10b', the device starts again due to the action of the liquid under pressure in reservoir 2.

After the whole of the device has moved through about half the angle contained between two successive contacts, the lever 10' engages with the contact 10b', which has the effect of exciting the electro-magnet 12a of the valve 12 and hence to close said valve.

As soon as the finger 13b falls into the following notch 13a (2), the device is again stopped by the closing of the valve 12 and the lever 10' is engaged with the control 10b'. The lever 10'' having been moved by said lever 10' will engage partly with the contact 10b and the contact 10c.

The operation is the same when passing on to the following positions.

On the return stroke, supposing that the device has accomplished a portion of its stroke, i. e. that the lever 10" engages the contact 10b alone and the lever 10' engages the contact 10b', when returning to the previous position by placing the control lever 7 on the contact a', the current is cut off from all the electro-magnets and in result the valve 4a opens and the entire device is put into motion in the opposite direction. The valve 4a is opened by the action of the lever 2h; the return spring of which has sufficient tension to overcome the action of the return spring of said valve 4a. The device will be stopped in the position corresponding to the engagement of the finger 13b in the notch 13a (0). In fact as soon as the whole of the device has moved through an angle equal to about half the angular distance between two successive contacts, the lever 10' will engage with the contact 10ᵃ', which closes the circuit of the electro-magnet 12a of the valve 12 and at the same time stops the whole of the device. On account of the slot in the lever 10', the lever 10" can never during the return stroke, be on a contact which is electrically connected with the source 8 of the current.

The passage from any position to another during the return stroke is the same as the passage just described.

According to this invention, when the driven member 20 consists of the controller of an electric motor, the servo motor is provided with means for stopping the whole of the device when the current in the motor exceeds a certain value, by means of an acceleration relay 11. For this purpose, said relay is excited by the current through the motor, and attracts its armature when this current exceeds a predetermined value. This relay closes a switch 11a which allows the current to pass as follows: battery 8, lead 11b, switch 11a, lever 11c of the switch 11a, leads 11d and 12m, and electro-magnet 12a so that in any position of the lever 7 the electro-magnet 12a is excited and the valve 12 closed, thus causing the stoppage as long as the current exceeds the predetermined value. When the same has returned to its normal value, the switch 11a opens and the device is again ready to work.

For certain applications it may be advantageous to arrange that the zero position of the receiving member takes place at the end of the forward stroke of the controlling device.

It is to be noted that in both directions, the want of current has the effect of bringing back the whole of the device and the receiving member to the zero position.

What I claim is:

1. In combination, a hydraulic servo motor including cylinders and pistons, a member driven thereby and adapted to occupy a limited number of positions stepped along its path, a closed reservoir containing liquid and gas under pressure, a discharge reservoir, valve means for controlling the flow of liquid between said cylinders and said reservoirs, an operating lever adapted to occupy a similar limited number of positions for controlling the opening of certain of the valves of the valve system in order to displace the motor in a given direction, means for closing another of the valves of the valve system to cause the motor to be stopped, said means being operated before the arrival of the driven member in the position corresponding to that of the operating lever, and a device controlled by the displacement of the driven member and adapted to allow said valve to be closed by the action of said means only when the driven member has reached the said position.

2. In combination, a hydraulic servo motor including cylinders and pistons, a member driven thereby and adapted to occupy a limited number of positions stepped along its path, a closed reservoir containing liquid and gas under pressure, a discharge reservoir, valves for controlling the flow of liquid between said cylinders and said reservoirs, an operating handle adapted to occupy a similar limited number of positions for controlling the opening of certain of said valves in order to displace the motor in a given direction, means for closing one of said valves, the closure of which causes the motor to be stopped, said means being adapted to be automatically operated before the arrival of the driven member in the position corresponding to that of the operating handle, a member controlled by the displacement of the driven member, a device interposed between said last named valve and the member controlled by the driven member, and adapted to allow said valve system to be closed by the action of said means only when the driven member has reached the said position.

3. In combination, a hydraulic servo motor including cylinders and pistons, a member driven thereby and adapted to occupy a limited number of positions stepped along its path, a closed reservoir containing liquid and gas under pressure, a discharge reservoir, valves for controlling the flow of liquid between said cylinders and said reservoirs, an operating handle adapted to occupy a similar limited number of positions for controlling the opening of certain of said valves in order to displace the motor in a given direction, means for closing one of said valves, the closure of which causes the motor to be stopped, said means being operated before the arrival of the driven member in the position corresponding to that of the operating handle, a cam shaped member actuated by the movements of the driven member, a connection between said cam shaped member and said last mentioned valve, said member being shaped so that it permits the closure of said valve only when the driven member has reached the said position.

4. In a control system, a hydraulic servo motor including cylinders and pistons, a member driven thereby and adapted to occupy a limited number of positions stepped along its path, a closed reservoir containing liquid and gas under pressure, a discharge reservoir, valves for controlling the flow of liquid between said cylinders and one of said reservoirs, an operating handle adapted to occupy a similar limited number of positions for controlling the opening of certain of said valves in order to displace the motor in a given direction, means for closing one of the valves, the closure of which causes the motor to be stopped, said means being adapted to be operated before the arrival of the driven member in the position corresponding to that of the operating handle, a cam shaped member actuated by the movements of the driven member, a connection between said cam member and said last mentioned valve, said member being shaped so that it permits the progressive closure of said valve and the complete closure of said valve only when the driven member has reached the said position.

5. In a control system, a hydraulic servo motor, comprising cylinders and pistons, a member driven thereby and adapted to occupy a limited number of positions stepped along its path, a closed reservoir containing liquid and gas under pressure, a discharge reservoir, valves for controlling the flow of liquid between said cylinders and one of said reservoirs, an operating handle adapted to occupy a similar limited number of positions for controlling the opening of certain of said valves in order to displace the motor in a given direction, an electromagnetic device for closing one of said valves, the closure of which causes the motor to be stopped, means for closing the electric circuit of said device before the arrival of the driven member in the position corresponding to that of the operating handle, a device interposed between said last named valve and a member controlled by the displacement of the driven member, and adapted to allow said valve to be closed by the action of said means only when the driven member has reached the said position.

6. In combination, a hydraulic servo motor including cylinders and pistons, a member driven thereby and adapted to occupy a limited number of positions stepped along its path, a closed reservoir containing liquid and gas under pressure, a discharge reservoir, fluid control means comprising an electric valve system located between the reservoirs and the motor, a second electric valve system, the closure of which causes the motor to be stopped, an operating handle adapted to be displaced on a similar limited number on contacts, two other groups of contacts in electric connection with the contacts of the operating handle, a first auxiliary handle (10') rigidly connected with the shaft of the motor and controlling the circuit of the second electric valve system, a second auxiliary handle (10") for controlling the circuit of the first electric valve system, and a lost-motion connection between said auxiliary handles.

In testimony whereof I affix my signature.
PAUL VANDER HAEGHEN.